United States Patent [19]  
Caramaschi et al.

[11] Patent Number: 4,516,909  
[45] Date of Patent: May 14, 1985

[54] HELICOPTER ROTOR

[75] Inventors: Vittorio Caramaschi, Gallarate; Pier Luigi Castelli, Busto Arsizio, both of Italy

[73] Assignee: Costruzioni Aeronautiche Giovanni Agusta S.p.A., Italy

[21] Appl. No.: 471,344

[22] Filed: Mar. 2, 1983

[30] Foreign Application Priority Data

Mar. 11, 1982 [IT] Italy ................. 67303 A/82

[51] Int. Cl.³ .................................. B64C 27/38
[52] U.S. Cl. ...................... 416/134 A; 416/140
[58] Field of Search .............. 416/134 A, 140 A, 141, 416/138 A, 135 B, 136 A

[56] References Cited

U.S. PATENT DOCUMENTS

| 3,111,172 | 11/1963 | Gorndt et al. | 416/135 B |
| 3,556,673 | 1/1971 | Killian | 416/134 A |
| 3,790,302 | 2/1974 | Pascher | 416/141 X |
| 3,824,037 | 7/1974 | Mautz et al. | 416/134 A X |
| 4,135,856 | 1/1979 | McGuire | 416/134 A |
| 4,257,739 | 3/1981 | Covington et al. | 416/140 A X |
| 4,297,078 | 10/1981 | Martin | 416/134 A |
| 4,342,540 | 8/1982 | Lovera et al. | 416/138 A X |
| 4,352,632 | 10/1982 | Schwarz et al. | 416/141 X |
| 4,361,415 | 11/1982 | Aubry | 416/140 A X |
| 4,425,082 | 1/1984 | Mussi et al. | 416/134 A X |

FOREIGN PATENT DOCUMENTS

| 2648343 | 4/1978 | Fed. Rep. of Germany | 416/134 A |
| 2827320 | 1/1980 | Fed. Rep. of Germany | 416/134 A |
| 2059897 | 4/1981 | United Kingdom | 416/141 |

Primary Examiner—Everette A. Powell, Jr.  
Attorney, Agent, or Firm—Kane, Dalsimer, Kane, Sullivan and Kurucz

[57] ABSTRACT

A helicopter rotor in which a central plate-like hub is provided with a plurality of axial apertures uniformly distributed around a central axis of rotation and each defined radially outwardly by a supporting peripheral bridge connected to a respective blade by a U-shape structure extending through the said aperture and coupled to the associated bridge by an elastomeric coupling; each U-shape structure being coupled to a respective radial projection of the hub by a further elastomeric coupling.

4 Claims, 2 Drawing Figures

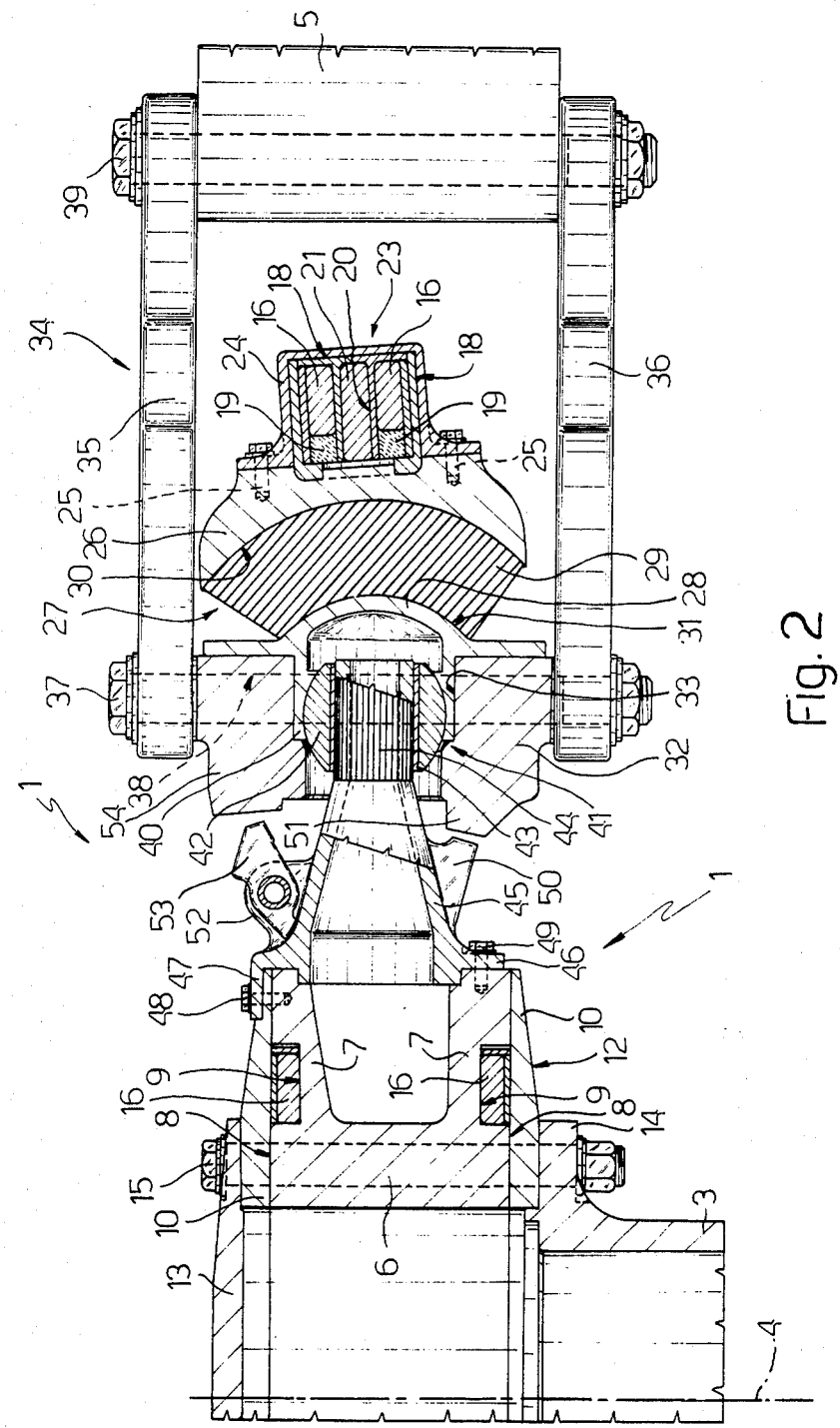

HELICOPTER ROTOR

BACKGROUND OF THE INVENTION

The present invention relates to a helicopter rotor.

In general, known helicopter rotors include a central plate-like hub having a substantially polygonal periphery from which a plurality of blades, uniformly distributed around a central axis of rotation of the rotor itself, extend radially outwardly. Each of the said blades is normally connected to the hub by an attachment element or bracket, a central portion of which extends through a respective axial aperture formed in the hub. The connection between each attachment bracket and the hub is normally made by an elastomeric coupling interposed between the said central portion of the bracket and a bridge element extending along the periphery of the hub and delimiting the radially outer part of the said aperture.

From what has been explained above it is possible to see how in rotors of the above described known type the elastomeric couplings interposed between the hub and each said attachment bracket are stressed not only in compression, because of the centrifugal force, but also in shear and consequently do not work in optimum operating conditions.

SUMMARY OF THE INVENTION

The object of the present invention is to provide a helicopter rotor of the above described type which will be substantially free from such disadvantage.

The said object is achieved by the present invention in that it relates to a helicopter rotor comprising a central hub rotatable about its axis, and a plurality of blades extending in a substantially radial direction outwardly from the said hub and each provided with attachment elements extending through a respective axial aperture of the said hub and cooperating, with the interposition of a respective elastomeric coupling, with an inner surface of a respective peripheral bridge element of the said hub, each said bridge element closing the radially outer part of a respective said aperture, characterised by the fact that the said apertures are uniformly distributed about a central support structure of the said hub, which has a plurality of radial projections each extending into a respective said aperture towards a respective said bridge element and through a radial hole formed in a respective said attachment element; each said projection being coupled to the associated said hole in an axially slidable manner and with the interposition of a further elastomeric coupling.

BRIEF DESCRIPTION OF THE DRAWINGS

Further characteristics and advantages of the present invention will become apparent from the following description with reference to the attached drawings, which illustrate a non limitative embodiment, in which:

FIG. 2 is a section taken on the line II—II of FIG. 1.

DETAILED DESCRIPTION OF THE INVENTION

Figure 1:
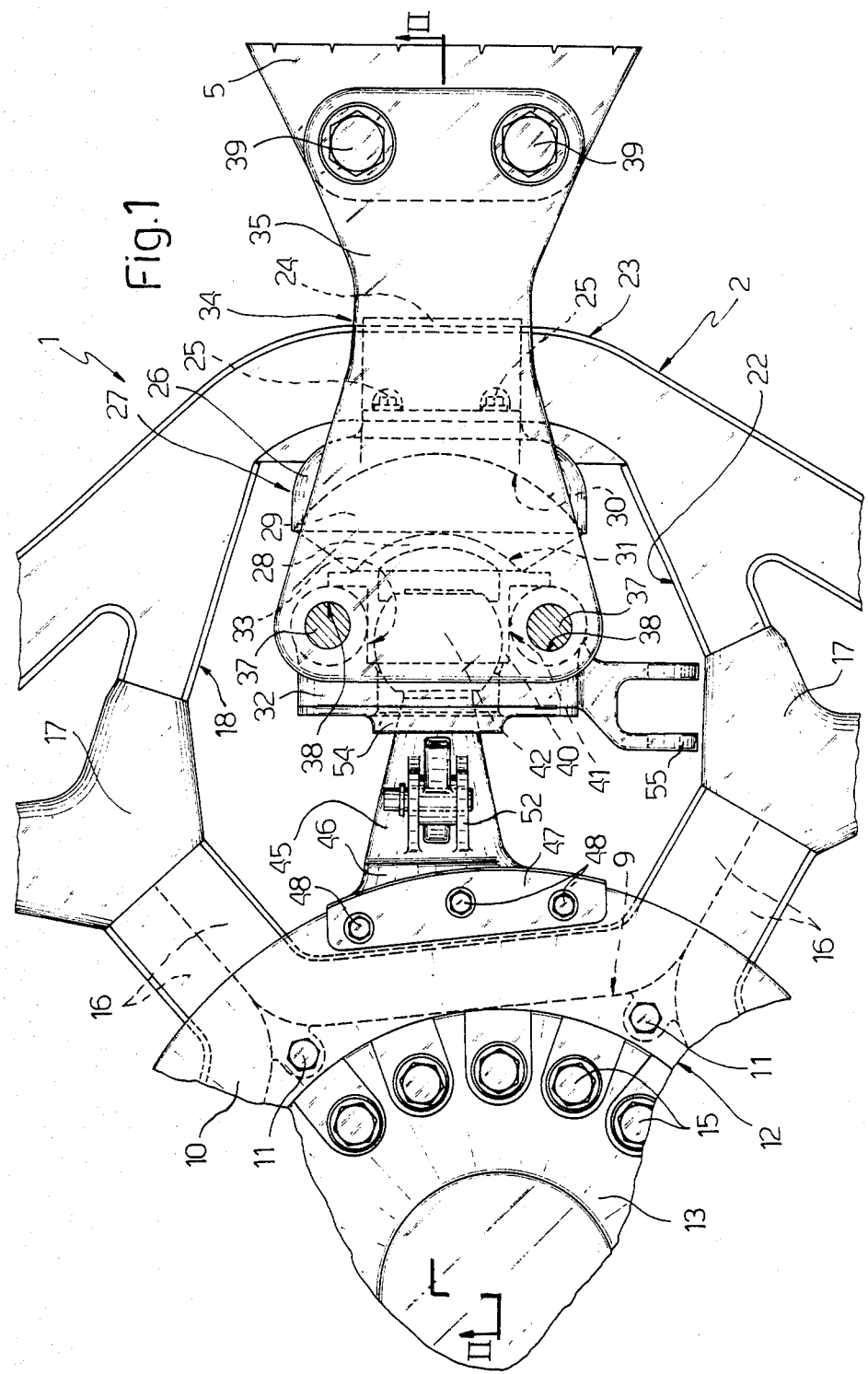
FIG. 1 is a partial plan view, with parts removed for clarity, of a helicopter rotor formed according to the principles of the present invention.

The attached Figures illustrate a helicopter rotor generally indicated with the reference numeral 1 and comprising a central hub 2 supported by a transmission shaft 3 coaxial with the hub 2 and with a central axis of rotation 4. The rotor 1 further includes a plurality of blades 5 uniformly distributed around the central axis 4 and extending radially outwardly from the hub 2.

As illustrated, in particular in FIG. 2, the hub 2 includes a central tubular body 6 having two outer annular end ribs 7 and delimited axially by two flat annular surfaces 8 perpendicular to the central axis 4 with which the body 6 is coaxial.

the surfaces 8 have a plurality of channels 9 of generally U-shape which are uniformly distributed around the central axis 4 and disposed so as to be concave in a radially outward direction. The channels 9 are closed by two annular plates 10 connected to the respective surfaces 8 by screws 11 (FIG. 1) and form with the tubular body 6 a tubular metal jacket 12 closed above by a cover 13 and supported from below by a flange 14 at the end of the shaft 4. The connection between this latter, the jacket 12 and the cover 13 is formed by a ring of axial through bolts 15.

Each of the channels 9 is occupied by an inner portion of an annular band 16 extending outwardly of the jacket 12 and rigidly connected to two contiguous bands 16 by cladding covers 17 disposed close to the jacket 12. The bands 16 are preferably made of oriented synthetic fibres and lie in two oppositely facing frusto-conical surfaces disposed with their larger bases substantially in contact with one another and their smaller ends connected to the opposite axial ends of the jacket 12. The said frusto-conical surfaces are defined by two hollow mesh casings 18 reinforced externally by the covering 17 and housing within them the bands 16 and a filling material 19.

The outer peripheries of the two casings 18 are disposed facing one another and superimposed and together define a channel 20 occupied by an annular band 21 (FIG. 2) preferably made of oriented synthetic fibres and extending along the whole of the periphery of the hub 2.

Each upper band 16 is aligned with a corresponding lower band 16 to define with this latter an axial aperture 22 (FIG. 1) which is delimited, in the region of the periphery of the hub 2, by a bridge 23. This latter, as illustrated in FIG. 2, is mainly constituted by three superimposed layers, the outer layers of which are formed by sections of band 16 and the intermediate layer of which is formed by a section of band 21.

As illustrated, in particular in FIG. 2, on each bridge 23 there is fitted a U-shape bracket 24 disposed in a vertical plane and concave radially towards the jacket 12. The free ends of each bracket 24 are connected by screws 25 to an outer shoe 26 of an elastomeric coupling 27 including an inner shoe 28 and a block 29 of elastomeric material interposed between a concave surface 30 of spherical cap shape of the shoe 26 and a convex surface 31 of spherical cap shape of the inner shoe 28. This latter is disposed in a substantially vertical position within the respective aperture 22 and includes an outwardly convex central part defining the surface 31 and a flat peripheral part connected to the outer surface of a plate 32 having a central through hole 33 disposed in a substantially radial position with respect to the jacket 12.

Each plate 32 constitutes an intermediate portion of a respective substantially U-shape bracket 34 which is disposed in a substantially vertical plane and concave radially outwardly with respect to the hub 2. Each bracket 34 includes a flat upper plate 35 and a flat substantially horizontal lower plate 36 disposed one above the other spanning the respective bridge 23 and connected together to the plate 32 by bolts 37 extending through holes 38 formed in the thickness of the plate 32 in a direction substantially parallel to the axis 4. The free outer ends of the plates 35 and 36 together clamp the attachment root of a respective blade 5 which is fixed to the plates 35 and 36 by two bolts 38 parallel to the bolts 37.

Each inner shoe 28 has a tubular projection 40 engaged within the hole 33 of the associated plate 32 and serving as an external support for an elastomeric coupling 41 including an elastomeric knee-joint 42 concentric with the surfaces 30 and 31 and fitted on a tubular diametral sleeve 43 substantially coaxial with the hole 33. The sleeve 43 is internally splined and is coupled in an axially slidable manner to a cylindrical splined section 44 at the end of a tubular projection 45 of frustoconical form extending from a base plate 46 into the associated aperture 22 in a substantially radial direction with respect to the axis 4. Each plate 46 has an upper edge 47 bent over the upper annular plate 10 and fixed to this latter and to the upper rib 7 by screws 48 parallel to the axis 4. Underneath, each plate 46 is connected to the lower rib 7 by radial screws 49.

Each projection 45 has a lower protuberance 50 able to cooperate with a corresponding protuberance 51 of the associated plate 32 to limit downward flapping of the associated blade 5, and an upper fork 52 carrying a hinged rocker 53. This latter is mounted to rotate in a substantially vertical plane and can cooperate with a protuberance 54 of the associated plate 32 to limit upward flapping of the associated blade 5 according to a law which varies with the angular velocity of the rotor 1. Finally, each plate 32 is provided laterally with a fork 55 which can transmit to the associated blade 5 the pitch variation controls.

In use, the presence of the elastomeric coupling 41 permits all the shear forces transmitted from each blade 5 to the hub 2 to be transferred directly to the metal jacket 12 thereby allowing the elastomeric coupling 29 to work substantially in compression, that is to say in optimum conditions both from an operational point of view and for durability.

We claim:

1. A helicopter rotor comprising:
a central hub rotatable about its axis;
a plurality of blades connected to and extending in a substantially radial direction outward form the hub, each blade having associated therewith:
an attachment element (34) coupled to the blade and extending through an axial aperture (22) of the hub;
a first elastomeric coupling adapted to provide cooperation between the attachment element (34) and an inner surface of a peripheral bridge element (23) of the hub;
the peripheral bridge element (23) which closes the radially outward part of the aperture (22);
the aperture (22) located radially outward of a central support structure (12) of the hub wherein a radial projection (45) extends into the aperture and towards the bridge element (23), and the projection (45) further extends through a radial hole (33) formed in the attachment element (34), the projection (45) being connected to the hole (33) in an axially slideable manner, a second elastomeric coupling (41) being disposed between the projection (45) and the radial hole (33).

2. A rotor according to claim 1, characterised by the fact that each said attachment element (34) includes two plates (35, 36) extending in a substantially radial direction from the said hub (2) and disposed one above and the other below the associated said bridge element (23), and an element (32) substantially parallel to the said axis (4) and extending through the associated said aperture (22) to join together the inner ends of the said two plates (35,36); the said hole (33) being formed through the said connection element (32).

3. A rotor according to claim 1, characterised by the fact that each said second, elastomeric coupling includes a knee-joint (42) of elastomeric material housed within the associated said hole (33) and coupled to the associated said projection (45) by means of a splined coupling (43-44).

4. A rotor according to claim 3, characterised by the fact that each said knee (42) is housed within a tubular projection (40) lodged within the associated hole (33) and rigidly connected to an inner shoe (28) of the associated said first elastomeric coupling (27).

* * * * *